H. F. FORTNER.
PAPER TRIMMING MEANS.
APPLICATION FILED SEPT. 14, 1917.
1,376,264.
Patented Apr. 26, 1921.
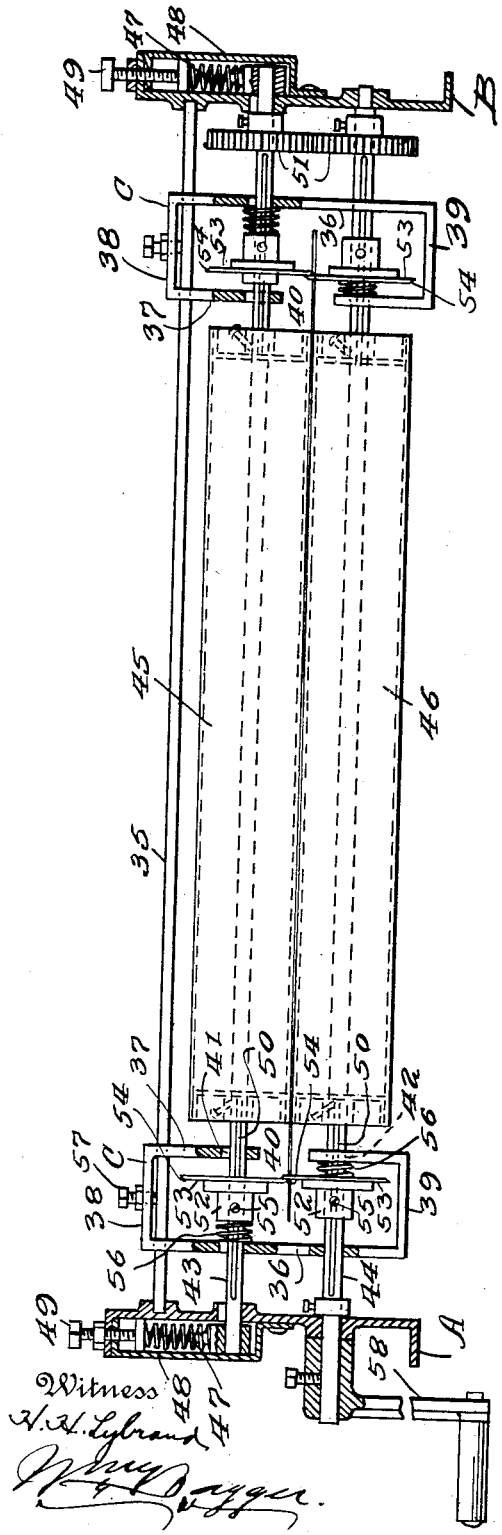
Witness
H. H. Lybrand
Inventor
H. F. Fortner
By Victor J. Evans
Attorney

UNITED STATES PATENT OFFICE.

HARRY F. FORTNER, OF CLINTON, INDIANA.

PAPER-TRIMMING MEANS.

1,376,264.  Specification of Letters Patent.  Patented Apr. 26, 1921.

Application filed September 14, 1917. Serial No. 191,466.

*To all whom it may concern:*

Be it known that I, HARRY F. FORTNER, a citizen of the United States, residing at Clinton, in the county of Vermilion and State of Indiana, have invented new and useful Improvements in Paper-Trimming Means, of which the following is a specification.

The object of my present invention is the provision of improved means for trimming paper; the said means being designed more especially for embodiment in machinery for trimming and pasting wall paper, though not restricted in its use to such application.

To the attainment of the foregoing the invention consists in the improvement as hereinafter described and definitely claimed.

In the accompanying drawing, hereby made a part hereof:—

The figure is a view illustrative of my novel paper trimming means.

Referring by letter and numeral to the said drawing:—

A and B indicate spaced frame members which may be and preferably are incorporated in a machine for trimming and pasting wall paper.

Receiving a rod 35 which extends between the members of the frame are bearings C which constitute supports for the feed rollers and the trimming knives. The bearings C are mounted adjacent to the inner faces of the frame members, said bearings C being of substantially rectangular form comprising outer and inner side members 36, 37, top members 38 and bottom members 39. The rod 35 extends through the outer and inner side members of the respective bearings C, the outer side member of each bearing being bent and located adjacent to one of the side walls of the frame structure. The inner side member of each bearing has a slotted opening 40 for the passage of the wall paper. The side members of the bearings C are provided with apertures 41, 42 that receive the shafts 43, 44 of the upper and lower feed rollers, 45, 46. It will be noted that the apertures 41 for the shaft of the upper feed roller are slightly oblong, permitting said upper feed roller to accommodate itself to different thicknesses of wall paper, said upper shaft being moreover subjected in any convenient manner to the pressure of tension springs 47 arranged in casings 48 on the wall members of the frame, the pressure of said springs being capable of adjustment by means of set screws 49.

The shafts of the respective feed rollers extend materially beyond the ends of the feed rollers, said extending or projecting ends being provided with longitudinal grooves 50. The said shafts are also provided with intermeshing gears 51 causing them to be reversely rotated.

Mounted on the grooved portions of the shafts 43, 44 are sleeves each carrying a circular cutter 53, said cutters overhanging the slots 40 of the respective bearings C. The cutters 53 have beveled cutting edges 54 which overlap each other so as to produce a shearing action. The sleeves or hubs 52 are equipped with set screws 55 slidably engaging the grooves 50 on the respective shafts, and springs 56 are provided whereby the respective cutters are forced resiliently in the direction of each other, producing a self-sharpening effect on the cutters. The top member 38 of each bearing C has a set screw 57, enabling the frames to be adjustably secured on the rod 35 to accommodate different widths of wall paper and to enable the same to be properly trained. The shaft 44 of the lower feed roller 46 is provided with a crank 58 whereby it may be rotated.

It will be apparent from the foregoing that when the crank 58 is turned and a strip of wall paper is fed between the rollers 45 and 46 and also between the trimming knives, the said sheet of paper will be expeditiously and efficiently trimmed.

What is claimed, is:—

1. The combination of the side walls of a main frame, a rod extending transversely between said side walls, open frame-like bearings adjustable on said rod in the direction of the length thereof and pendent from the rod and having opposite openings in their inner side walls adapted for the passage of paper, means to adjustably fix said bearings to the rod, feed rollers arranged between said bearings and having shafts extending through apertures in the bearings and journaled in the side walls of the frame, knives mounted on to rotate with and slide longitudinally of said shafts, said knives having lapped portions outwardly beyond and opposite said openings in the inner side walls of the bearings, springs mounted on the shaft of one feed roller and interposed between the outer walls of the bearings and the knives on said shaft, and springs mounted on the shaft of the other roller and interposed between the inner walls of the bearings and the knives on said shaft.

2. The combination of the side walls of a main frame, a rod extending transversely between said side walls, open frame-like bearings adjustable on said rod in the direction of the length thereof and pendent from the rod and having opposite openings in their inner side walls adapted for the passage of paper, means to adjustably fix said bearings to the rod, feed rollers arranged between said bearings and having shafts extending through apertures in the bearings and journaled in the side walls of the frame; the shaft of the upper feed roller being vertically adjustable in the side walls of the frame and in said bearings, housings on the side walls of the frame, bearings on the shaft of the upper roller, and movable vertically in said housings, adjustable abutments in the housings above the bearings, springs between said bearings and abutments, knives mounted on to rotate with and slide longitudinally of said shafts, said knives having lapped portions outwardly beyond and opposite said openings in the inner side walls of the bearings, springs mounted on the shaft of one feed roller and interposed between the outer walls of the bearings and the knives on said shaft, and springs mounted on the shaft of the other roller and interposed between the inner walls of the bearings and the knives on said shaft.

3. The combination of a frame having side walls, supporting means extending transversely between said side walls, open frame-like bearings adjustably fixed apart and supported by said means and having opposite openings in their inner side walls for the passage of paper, feed rollers disposed between said bearings and having shafts extending through the bearings and journaled in the side walls of the frame, and knives mounted on to rotate with and be adjusted longitudinally of the shaft portions within the bearings and having coöperating portions arranged outwardly beyond and opposite said openings in the inner side walls of the bearings.

4. The combination of a frame having side walls, supporting means extending between said side walls, bearings carried by said supporting means, feed rollers arranged between said bearings and having shafts extending through the bearings and journaled in the side walls of the frame, the bearings having opposite openings in their inner sides for the passage of paper, and knives mounted on the shafts to rotate with and move longitudinally of the same and having coöperating portions arranged opposite and outwardly beyond the openings in the bearings.

5. The combination of a frame having side walls, supporting means extending between said side walls, bearings carried by said supporting means, feed rollers arranged between said bearings and having shafts extending through the bearings and journaled in the side walls of the frame, the bearings having opposite openings in their inner sides for the passage of paper, knives mounted on the shafts to rotate with and move longitudinally of the same and having coöperating portions arranged outwardly beyond and opposite the openings in the bearings, means to yieldingly press one of the shafts toward the other, a driving connection between the shafts, and means to turn one of the shafts.

In testimony whereof I affix my signature.

HARRY F. FORTNER.